Patented Mar. 21, 1950

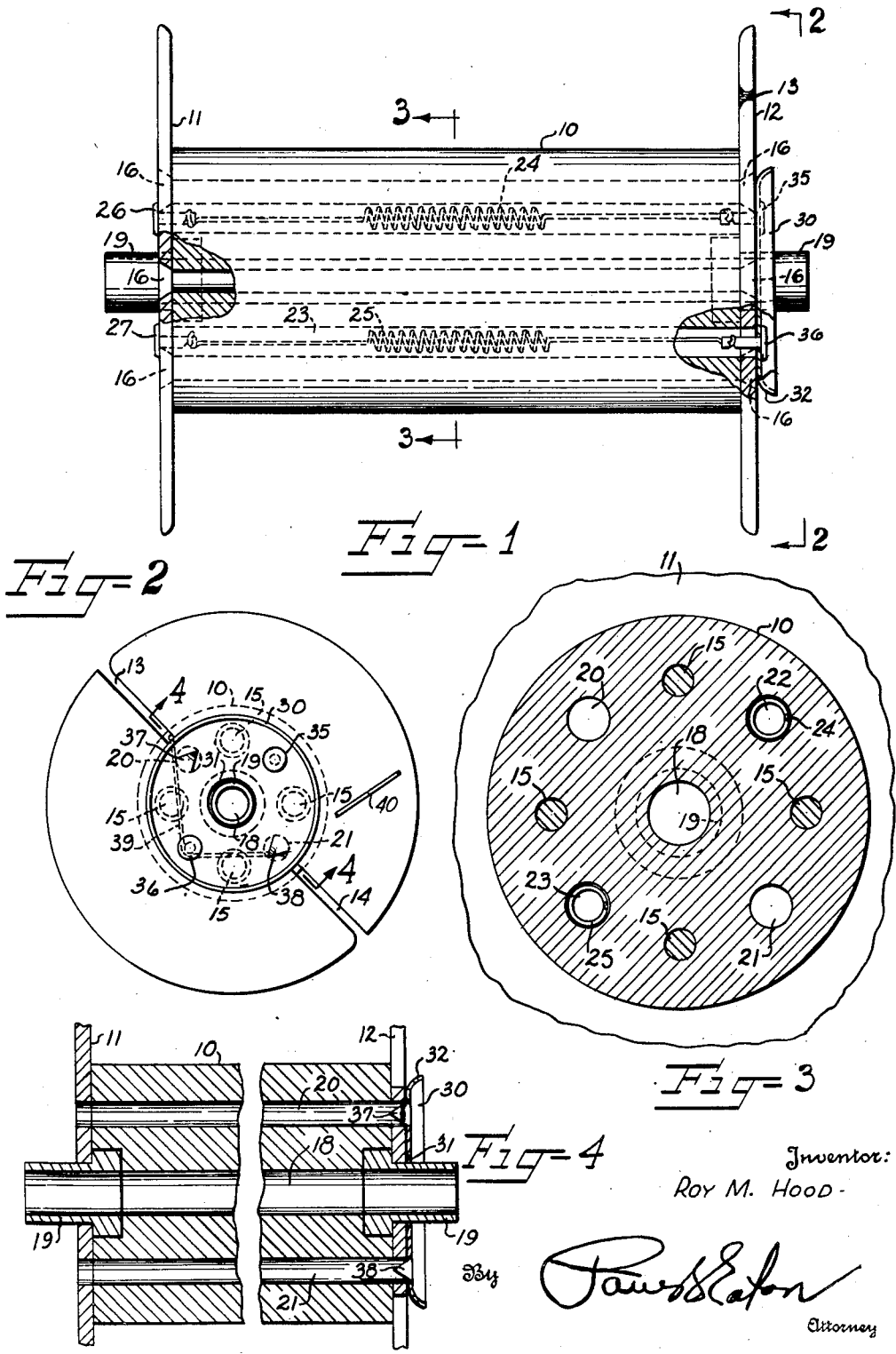

2,501,515

UNITED STATES PATENT OFFICE 2,501,515

YARN FASTENING MEANS FOR SPOOLS

Roy M. Hood, McColl, S. C.

Application April 29, 1947, Serial No. 744,627

1 Claim. (Cl. 242—125)

This invention relates to an improved spool for use on uptwisters, or as a warping spool and the like, and comprises a barrel and a head on each end of the barrel, with one of the heads being slotted, together with clamping and cutting means resiliently mounted on the outer surface of one of the heads whereby the yarn, before a winding operation, can be deposited on the barrel of the spool and passed through a slot in one of the head portions and passed between a clamping member and the surface of the head and clamped in position, and with said clamping member having inturned barbs adapted to fit into suitable bores or cavities in the spool head, and whereby when the yarn or thread is clamped in position it can be given a quick jerk which will cause one of the barbs against which it is placed to sever the extending end.

It is therefore an object of this invention to provide in an uptwisting spool and the like having a barrel portion and two head portions, a disk member resiliently pressed against the exterior surface of one of the heads and the yarn end is adapted to be passed between the resiliently mounted disk and the surface of the spool head to clampingly hold the same in position and said resiliently mounted disk having one or more inturned barbs which are adapted to cut the extending end of the yarn as it is clamped in position.

Some of the objects of the invention having been stated, other objects will appear as the description proceeds when taken in connection with the accompanying drawings, in which Figure 1 is an elevation of my improved spool with portions thereof broken away;

Figure 2 is an end view of Figure 1 taken along the line 2—2 in Figure 1;

Figure 3 is a vertical sectional view through the barrel portion of the spool and taken along the line 3—3 in Figure 1;

Figure 4 is a longitudinal sectional view taken substantially along the line 4—4 in Figure 2.

Referring more specifically to the drawings, the numeral 10 indicates the barrel portion of the spool having disks or heads 11 and 12 secured on the ends thereof. One of the disks, such as 12, is adapted to have one or more slots such as 13 and 14 cut therein. The barrel portion 10 has a plurality of longitudinally extending bores which extend from one end to the other. Some of these bores are penetrated by shafts or rivets 15 which also penetrate coinciding bores in the heads 10 and 11 and are expanded or branded as at 16 at each end thereof to securely fasten the heads or disks 11 and 12 to the barrel portion 10.

The main body of the spool also has a longitudinally extending bore 18 extending centrally thereof from one end to the other and in the ends of which suitable bushings 19 are mounted and which extend substantially from the outer surfaces of each of the disks or heads 11 and 12 and serve in a conventional manner for guiding or holding the spool in position during an uptwisting operation.

The barrel 10 also has a pair of bores 20 and 21 extending from end to end thereof which are not occupied but are for the reception of barbs or cutting means associated with the disk on the end of the spool as will be presently described. These bores 20 and 21 could be small cavities near the barbs and need not extend entirely through the barrel. The barrel 10 also has a pair of longitudinally extending bores 22 and 23 in which tension springs 24 and 25 are mounted. In one end of these bores 22 and 23 are adapted to be positioned suitable spring anchors 26 and 27 which have a hooked portion at their inner ends to which one end of the tension springs 24 and 25 respectively are secured.

Adapted to surround the bushing 19 at one end of the spool is a cup-shaped annular disk 30 which has a centrally disposed hole 31 adapted to loosely fit around the bushing 19. The disk 30 has a peripheral inwardly sloping portion 32 adapted to guide an end of a strand of yarn 39 inwardly between the inner face of the disk 30 and the outer face of the spool head 12.

The disk 30 has a pair of holes disposed 180° apart into which are fitted suitable spring anchors 35 and 36 which are hooked on their inner ends for engaging the other ends of the tension springs 24 and 25. Thus the tension springs hold the disk 30 in resilient engagement with the exterior surface of the spool head 12. The disk 30 has a pair of inwardly directed barbs 37 and 38 which are adapted to fit into the bores 20 and 21.

It is therefore seen that at the beginning of a winding operation the yarn 39 can be directed on the inside of the spool head 12 and through one of the slots 13 or 14 and passed between the disk 30 and the outer surface of the spool head 12 and pulled inwardly until it engages one of the barbs 37 or 38 and then a slight jerk can be given to the extending end 40 of the yarn and it will be cut by one of the barbs 37 or 38, thus leaving no protruding end.

If desired, when the winding of the spool has been completed, the extending end of the yarn could likewise be passed through one of the slots 13 or 14 and likewise secured between the disk 30 and the outer face of the spool 12.

It is thus seen that the yarn 39, after being placed on the inside of the spool head 12, can be passed through one of the slots 13 or 14 and slid in between the disk 30 and the outer face of the spool head 12 until it engages the barb 38 at which time it can be given a slight jerk and the barb 38 will cut the end which is shown in Figure 2 and designated by reference character 40.

In the drawings and specification there has been set forth a preferred embodiment of the invention, and although specific terms are employed, they are used in a generic and descriptive sense only, and not for purposes of limitation, the scope of the invention being defined in the claim.

I claim:

In a spool having a barrel and head portions secured to each end of the barrel, said barrel having hub members extending from the central end portions thereof, an annular disk member loosely mounted around one of the hub portions, a pair of bores extending longitudinally of the barrel portion and through the head portions and each having a tension spring mounted therein, means anchoring one end of the tension springs to one of the head portions, a pair of spring anchors extending through the annular disk member and anchored to the other ends of said tension springs to resiliently hold the annular disk member against the outer face of one of the head portions of the spool, said barrel having a pair of cavities in the end thereof adjacent the annular disk member and a pair of inwardly bent barbs struck from the annular disk member and extending into said cavities, the head member associated with the annular disk member having a radially disposed slot therein whereby an end of yarn can be deposited on the spool barrel and passed through said slot and passed between the outer surface of the spool head and the annular disk member until it engages one of the barbs, whereupon a slight jerk will sever the extending end of the yarn when it is impinged against one of the barbs.

ROY M. HOOD.

REFERENCES CITED

The following references are of record in the file of this patent:

UNITED STATES PATENTS

| Number | Name | Date |
|---|---|---|
| 808,114 | Rowley et al. | Dec. 26, 1905 |
| 1,274,776 | Preissner | Aug. 6, 1918 |
| 1,868,408 | Clinton | July 19, 1932 |
| 2,048,995 | Clinton | July 28, 1936 |
| 2,425,827 | Raucourt | Aug. 19, 1947 |

FOREIGN PATENTS

| Number | Country | Date |
|---|---|---|
| 510,857 | France | Sept. 15, 1920 |
| 638,676 | Germany | Nov. 20, 1936 |